Figure 1:
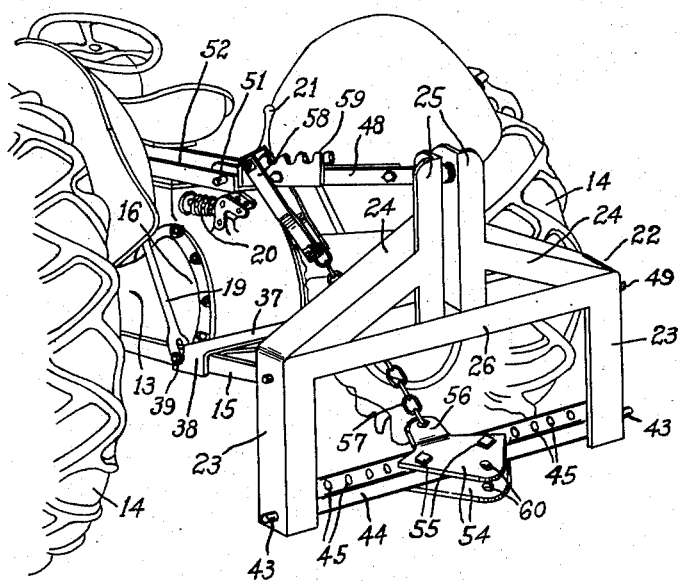

Nov. 28, 1950  K. W. CLINE ET AL  2,531,768
TRACTOR DRAWBAR

Filed July 1, 1946  3 Sheets-Sheet 1

INVENTOR.
Kenneth W. Cline and
BY DeFord Rinehart

Frease and Bishop
ATTORNEYS

Nov. 28, 1950     K. W. CLINE ET AL     2,531,768
TRACTOR DRAWBAR

INVENTOR.
Kenneth W. Cline and
BY DeFord Rinehart

Frease and Bishop
ATTORNEYS

Nov. 28, 1950  K. W. CLINE ET AL  2,531,768
TRACTOR DRAWBAR
Filed July 1, 1946  3 Sheets-Sheet 3

INVENTOR.
Kenneth W. Cline and
BY DeFord Rinehart
Frease and Bishop
ATTORNEYS

Patented Nov. 28, 1950

2,531,768

UNITED STATES PATENT OFFICE 2,531,768

TRACTOR DRAWBAR

Kenneth W. Cline and De Ford Rinehart, Magnolia, Ohio

Application July 1, 1946, Serial No. 680,766

7 Claims. (Cl. 280—33.44)

The invention relates to improvements in tractor draw bars and more particularly to a tractor hitch or adapter attachment for draw bar load which is especially devised for use in connection with a tractor of the type disclosed in Ferguson Patents No. 2,118,180 and No. 2,118,181 dated May 24, 1938.

Tractors of this type have a pair of rearwardly extending draw bar levers connected by linkage with an hydraulic control or lift instrumentality by means of which said draw bar levers may be raised or lowered. A draw bar is connected to the rear ends of said draw bar levers for coupling vehicles or other loads to the tractor.

It is customary to provide linkage for automatically operating the hydraulic control or lift mechanism for automatically relieving the pressure on the tractor when an implement pulled thereby strikes an obstruction, and while such an arrangement is satisfactory for coupling a plow, cultivator or other implement engaged in the ground, it is not practical for coupling a wheeled vehicle or other draw bar load to the tractor, because the force represented by the resistance of the load to forward motion, exerted on the draw bar, is rendered effective in opposite direction upon the thrust link which operates the hydraulic control, and should this thrust force exceed a predetermined maximum the thrust link automatically actuates the hydraulic control, lowering the draw bar levers and losing the traction of the tractor.

It is therefore an object of the invention to provide a draw bar structure for such tractors which adapts the tractor for use with various types of draw bar loads in such manner as to obtain the advantages of increased traction through distribution of the weight from the load pulled.

Another object is to provide a draw bar structure having the above advantages which is simple and inexpensive in construction, readily applicable to tractors and efficient in operation.

A further object is to provide a draw bar structure having a point of connection of the vehicle considerably below the rear ends of the draw bar levers and having a thrust link above said levers connected to a bracket rigidly mounted upon the tractor at a point above the rear axle so as to exert a forward and downward thrust upon all four wheels of the tractor to increase its traction and hold the front end down.

A still further object of the invention is to provide a novel tractor hitch substantially in the form of a draw bar frame for connection intermediate its ends to the rear ends of the draw bar levers of the tractor, the draw bar being connected to the lower end of said draw bar frame and the thrust link to the upper end thereof.

It is another object to provide a tractor hitch of this type in which a triangular frame is connected at its apex to the cross bar of the draw bar frame and its opposite corners to intermediate portions of the draw bar levers to gain stability in the draw bar.

Still another object is to provide such a device in which a novel type of clevis or hitch plate is mounted upon the draw bar for coupling a load thereto in order to execute a 90° turn.

It is a further object of the invention to provide a yoke and chain suspended from a bracket mounted on the thrust link for supporting the draw bar at any desired height without the use of the hydraulic system on the tractor.

Figure 2:
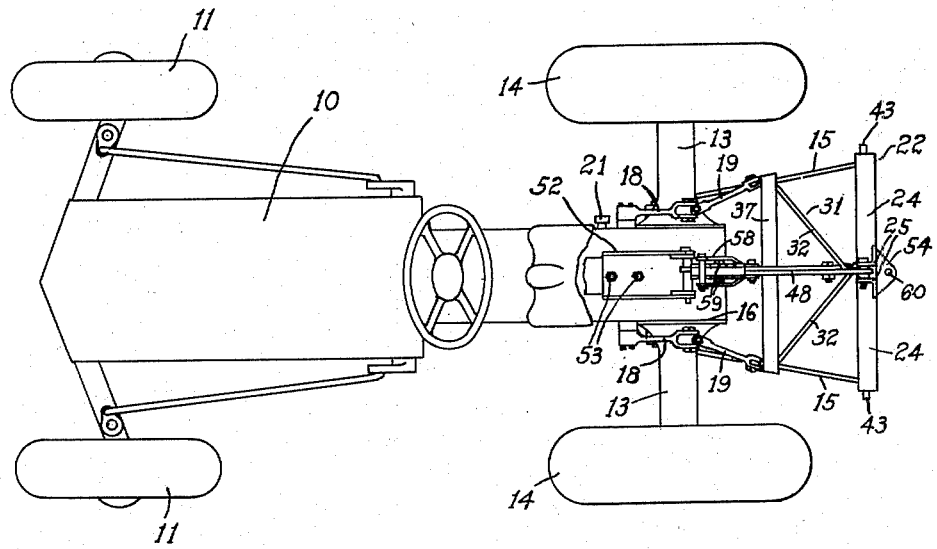
Figure 3:
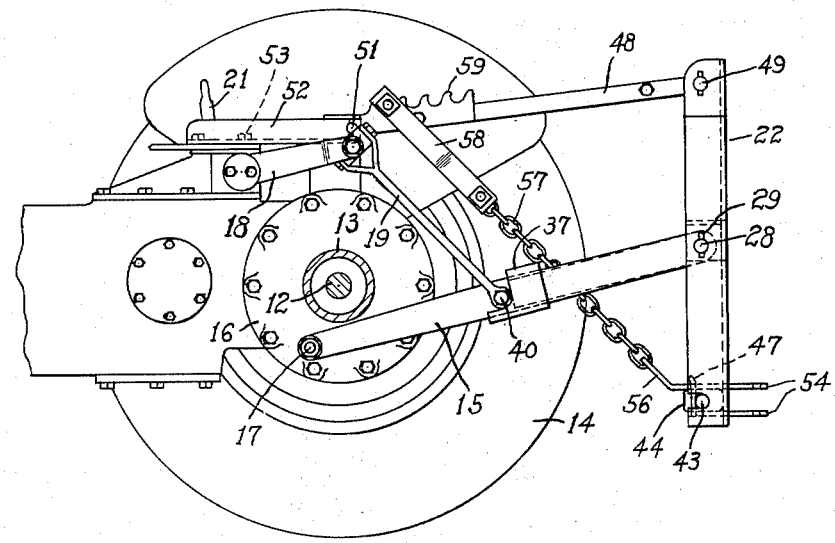
Figure 4:
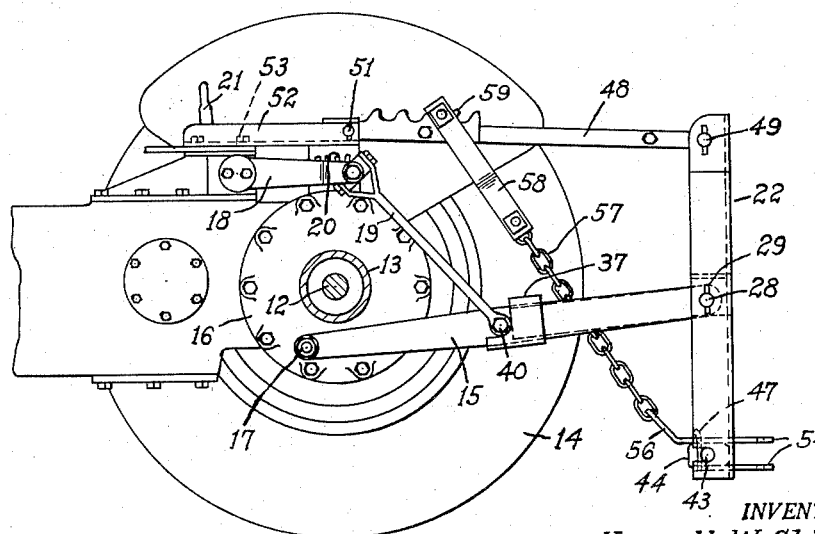
Figure 5:
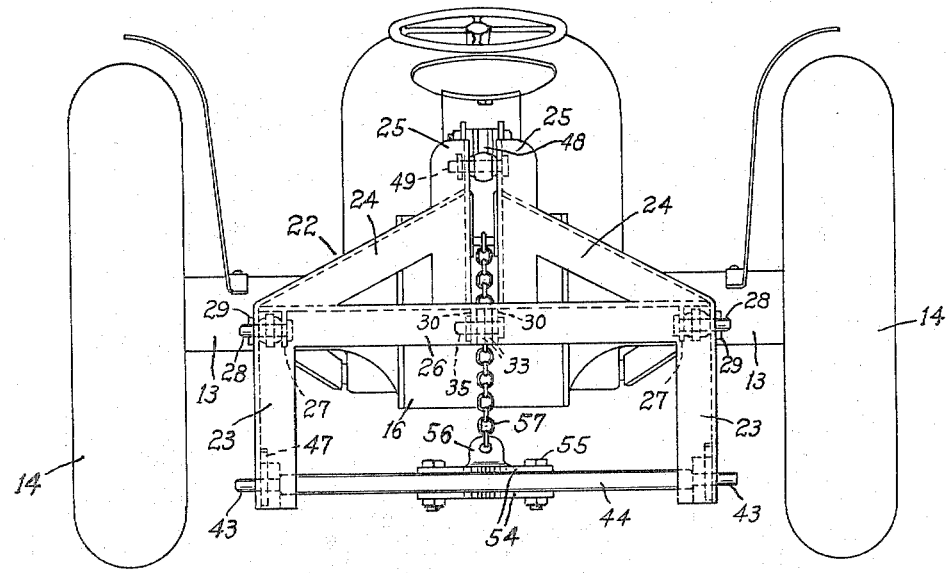
Figure 6:
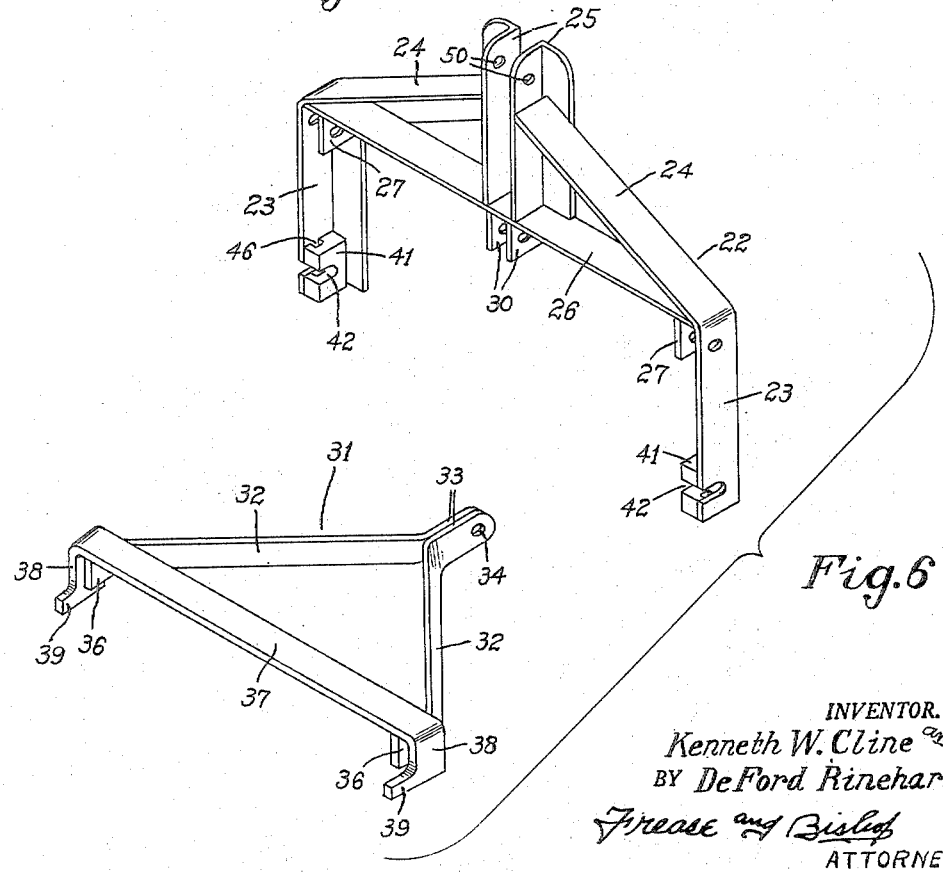

The above objects together with others which will be apparent from the drawings and following description, or which may be later referred to, may be attained by constructing the improved draw bar in the manner illustrated in the accompanying drawings, in which:

Figure 1 is illustrating the draw bar attachment operatively associated with a well known type of farm tractor;

Fig. 2 a top plan view of a tractor with the improved draw bar attachment applied thereto;

Fig. 3 a vertical longitudinal sectional view through the rear portion of a tractor showing the draw bar attachment connected thereto with the draw bar levers of the tractor in raised position;

Fig. 4 a view similar to Fig. 3 showing the draw bar levers in lowered position;

Fig. 5 a rear elevation of a tractor showing the draw bar attachment applied thereto; and Fig. 6 a detached perspective view of the draw bar frame and triangle frame of the attachment separated from each other.

The invention is illustrated as applied to a power driven tractor of the Ferguson type having a power plant indicated generally at 10 and supported upon the front wheels 11, and having power driving connection with the rear axles 12 located within the usual wheel housings 13 and having the rear wheels 14 mounted thereon.

A pair of rearwardly extending draw bar levers 15 are connected to the differential housing 16 of the tractor, being pivoted thereto beneath and somewhat forwardly of the rear axle, as indicated at 17. Hydraulic lift arms 18 are connected by the elevating links 19 to the draw bar levers 15.

The lift arms 18 are operated by an hydraulic power device (not shown) located within the tractor housing and arranged to be automatically operated through a spring loaded thrust rod 20, or manually controlled by a lever 21.

The thrust rod 20 is yieldably sustained by the coiled spring which while compressible is of such strength as to sustain the thrust resulting from a normal load but with an excessive load sustained thereon the draw bar will drop.

The structure thus described comprises generally the Ferguson type of tractor. The improved draw bar attachment to which the invention pertains comprises primarily a draw bar frame formed of channel iron or the like and indicated generally at 22.

This frame includes the substantially vertically disposed arms 23 the upper portions of which are inwardly and upwardly inclined as indicated at 24 and connected at their ends to the slightly spaced vertical arms 25, the lower ends of which are connected to the horizontal cross bar 26 which is connected at its ends to the vertical arms 23 at a point spaced above their lower ends. All of these parts are welded or otherwise rigidly connected together to form a solid frame.

A depending ear 27 is rigidly connected to the under side of the cross bar 26 of the frame at a point slightly spaced from each of the vertical side arms 23 and the perforated rear ends of the draw bar levers 15 are received between said side arms 23 and the adjacent ears and pivotally connected thereto as by pins 28, cotter pins 29 or the like being located through the pins 28 for retaining them in position.

A spaced pair of perforate ears 30 is rigidly connected to the under side of the cross bar 26 at its center for connection of the triangular frame indicated generally at 31. This triangular frame comprises the pair of forwardly diverging arms 32 having the angularly disposed rear end portions 33 welded or otherwise fixed together and perforated as at 34 to receive a pin 35 for connecting them to the ears 30 of the draw bar frame.

The forward end of the arms 32 are angularly disposed in parallel relation to each other as indicated at 36 and connected to the under side of the cross bar 37 at points spaced from its opposite ends which are bent downward as at 38 and provided with the rearwardly disposed lugs 39.

When the improved draw bar attachment is mounted upon the draw bar levers 15 the forwardly disposed angular ends 36 of the arms 32 are received upon the inner sides of the levers 15 and the cross bar 37 rests upon the top of said levers with the downturned ends 38 located on the outer sides of the draw bar levers and the forwardly disposed lugs 39 located beneath the pivotal points 40 of the elevating links 19 as shown in the drawings.

Blocks 41 are welded or otherwise rigidly connected to the lower ends of the side arms 23 of the draw bar frame and provided with the forwardly opening horizontal slots 42 to receive the pins or journal ends 43 of the draw bar or hitch bar 44, which may be the conventional draw bar used upon tractors of this type and designed to be ordinarily connected to the perforate rear ends of the draw bar levers 15.

A plurality of apertures 45 may be formed in the draw bar 44 as in usual practice. Vertical apertures 46 are provided in the blocks 41 to receive pins 47 to retain the draw bar 44 in the slots 42.

A thrust link 48 has its rear end located between the vertical bars 25 of the draw bar frame 22 and connected thereto as by a pin 49 located through the perforate end of the thrust link and through the apertures 50.

The forward end of the thrust link is connected as by the pin 51 to a bracket 52 bolted or otherwise rigidly mounted upon the tractor, preferably upon the top of the tractor housing above and forwardly of the rear axle as indicated at 53.

Substantially triangular hitch plates 54 are rigidly connected to the draw bar 44 as by bolts 55 or the like forming a clevis for attaching the load to be drawn by the tractor.

An upwardly and forwardly disposed angular ear 56 may be formed upon the upper hitch plate 54 for connection to a chain 57, the upper end of which is connected to a yoke 58 which is adapted to be adjustably attached to the bracket 59 mounted on the thrust link 48 for supporting the draw bar attachment at any desired height as shown in Figs. 3 and 4.

In the operation, the tongue, clevis or chain of a vehicle or load to be drawn by the tractor is connected to the hitch plates 54 by locating a pin or the like through the apertures 60 in the hitch plates.

The lever 21 is manually operated to actuate the usual hydraulic mechanism in the tractor, which through the lift arms 18 and the elevating links 19 positions the draw bar levers 15 so as to locate the hitch plates 54 of the improved draw bar attachment at the proper height to engage the tongue of the vehicle to be drawn.

The chain 57, suspended from the yoke 58 is adjustably connected to the bracket 59 upon the thrust link 48 and to the ear 56 upon the upper hitch plate 54, holding the draw bar attachment at the desired height as shown in Figs. 1, 3, 4 and 5.

If it is necessary to raise the hitch plates 54 to accommodate the vehicle or load to be drawn, the lever 21 is operated to actuate the hydraulic control mechanism which controls the lifting instrumentality to raise the draw bar levers 15 as shown in Fig. 3 and the chain 57 is adjusted as above to hold the parts in the elevated position.

The draft load is exerted upon the lower end of the draw bar frame 22 tending to pivot the same around the pivot points 28, thereby placing the thrust stress on the thrust link 48 which thrust is exerted against the bracket 52 rigidly connected to the tractor above the rear axle of the tractor, resulting in increased traction on the traction wheels of the tractor, corresponding to the draft load of the vehicle, tending to hold the tractor in a level position with the front end continuously resting on the ground.

It is known that attempts have been made to provide draw bar attachments pivoted upon the draw bar levers of tractors of this type and having a thrust link connected to the upper end of the attachment and to the spring loaded thrust rod 20 which automatically controls the hydraulic mechanism within the tractor which actuates the lift instrumentality.

Such devices are not practical for coupling a load to a tractor of this type as an excessive increase in the draft load which increases the thrust upon the thrust link 48 sufficiently to compress the spring of the thrust rod 20 will automatically operate the lift instrumentality causing the draw bar levers 15 to drop, thereby losing the necessary traction on the rear wheels. Also an excessive load thrown against the draw bar would result in serious damage to the automatic hydraulic system of the tractor.

Furthermore such devices do not provide a rigid thrust against the tractor above the rear axle of the tractor as in applicant's invention, wherein the thrust link 48 is attached to and thrusts against a bracket rigidly mounted upon the tractor so as to at all times place the thrust stress thereon resulting in increased traction on the wheels of the tractor.

We claim:

1. In combination with a tractor having a pair of draw bar levers, an upright draw bar attachment comprising a draw bar frame pivoted intermediate its ends to said levers, a draw bar connected to the lower end of said frame, hitch plates connected to the top and bottom of the draw bar and having apertures therein spaced rearwardly from the draw bar for connection to a draw bar load, an immovable bracket rigidly mounted upon the tractor above the rear axle, and a thrust link connected to the upper end of the draw bar frame and to said bracket, and a chain connected to the upper hitch plate and to said thrust link for holding the draw bar at desired height and means for adjusting the chain to change the height of the draw bar.

2. In combination with a tractor having a pair of draw bar levers, an upright draw bar attachment comprising a draw bar frame pivoted intermediate its ends to said levers, a draw bar connected to the lower end of said frame for connection to a draw bar load, a bracket rigidly mounted upon the tractor above the rear axle, a thrust link connected to the upper end of the draw bar frame and to said bracket, and a triangular frame pivotally connected to the draw bar frame intermediate the ends thereof and connected to said draw bar levers.

3. In combination with a tractor having a pair of draw bar levers, an upright draw bar attachment comprising a draw bar frame pivoted intermediate its ends to said levers, a draw bar connected to the lower end of said attachment for connection to a draw bar load, a thrust link connected to the upper end of said draw bar frame and to a rigid portion of the tractor, and a triangular frame pivotally connected to the draw bar frame intermediate the ends thereof and connected to said draw bar levers.

4. In combination with a tractor having a pair of draw bar levers, an upright draw bar attchment comprising a draw bar frame pivoted intermediate its end to said levers, a draw bar connected to the lower end of said frame, a bracket rigidly mounted upon the tractor above the rear axle thereof, a thrust link connected to the upper end of the draw bar and to said bracket, a flexible member connected to the draw bar and to the forward end portion of the thrust link for holding the draw bar at desired height and means for adjusting the flexible member to change the height of the draw bar.

5. In combination with a tractor having a pair of draw bar levers, an upright draw bar attachment comprising a draw bar frame pivoted intermediatge its ends to said levers, a bracket rigidly mounted upon the tractor above the rear axle thereof, a thrust link connected to the upper end of the draw bar and to said bracket, a suspension member connected to the draw bar and to the forward end portion of the thrust link for holding the draw bar at desired height and means for adjusting the suspension member to change the height of the draw bar.

6. In combination with a tractor having a pair of draw bar levers and a hydraulic control means connected to said draw bar levers, an upright draw bar frame pivoted intermediate its ends to said levers, a draw bar connected to the lower end of said frame for connection to a draw bar load and a thrust link connected to the upper end of said frame and to a rigid immovable portion of the tractor at a point spaced from the hydraulic control means, whereby an excessive load upon the draw bar will be exerted as a thrust through said thrust link resulting in increased traction upon the wheels of the tractor without permitting operation of said hydraulic control means to lower the draw bar levers.

7. In combination with a tractor having a pair of draw bar levers and a hydraulic control means connected to said draw bar levers, an upright draw bar attachment comprising a draw bar frame pivoted intermediate its ends to said levers, a draw bar connected to the lower end of said frame for connection to a draw bar load, an immovable bracket rigidly mounted upon the tractor above the rear axle thereof at a point spaced from the hydraulic control means, and a thrust link connected to the upper end of the draw bar frame and to said bracket, whereby an excessive load upon the draw bar will be exerted as a thrust through said thrust link resulting in increased traction upon the wheels of the tractor without permitting operation of said hydraulic control means to lower the draw bar levers.

KENNETH W. CLINE.
DE FORD RINEHART.

REFERENCES CITED

The following references are of record in the file of this patent:

UNITED STATES PATENTS

| Number | Name | Date |
| --- | --- | --- |
| 2,321,516 | Robertson | June 8, 1943 |
| 2,341,807 | Olmstead et al. | Feb. 15, 1944 |